(12) United States Patent  (10) Patent No.: US 6,669,303 B2
Dodd  (45) Date of Patent: Dec. 30, 2003

(54) TAG AXLE SUSPENSION SYSTEM FOR A DUMP VEHICLE

(75) Inventor: Cully B. Dodd, McKinney, TX (US)

(73) Assignee: Watson & Chalin Manufacturing, Inc., McKinney, TX (US)

(*) Notice: Subject to any disclaimer, the term of this patent is extended or adjusted under 35 U.S.C. 154(b) by 0 days.

(21) Appl. No.: 09/993,540

(22) Filed: Nov. 16, 2001

(65) Prior Publication Data

US 2003/0094846 A1 May 22, 2003

(51) Int. Cl.[7] ............................................... B62D 61/12
(52) U.S. Cl. .............. 298/17 B; 298/22 R; 298/17 SG; 298/23 R; 280/86.5; 180/209
(58) Field of Search .......................... 298/17 B, 17 SG, 298/22 P, 23 R, 22 R; 180/209, 24.02; 280/86.5, 124.128, 124.153, 405.1; 414/917

(56) References Cited

U.S. PATENT DOCUMENTS

| | | | |
|---|---|---|---|
| 3,912,293 A | | 10/1975 | Harbers |
| 4,063,779 A | * | 12/1977 | Martin et al. ............... 298/22 P |
| 4,684,142 A | | 8/1987 | Christenson |
| 4,783,096 A | | 11/1988 | Ramsey et al. |
| 4,848,783 A | | 7/1989 | Christenson et al. |
| 4,940,287 A | * | 7/1990 | Ritchie ..................... 298/23 R |
| 5,018,755 A | | 5/1991 | McNeilus et al. |
| 5,090,495 A | | 2/1992 | Christenson |
| 5,403,031 A | * | 4/1995 | Gottschalk et al. |
| 5,540,454 A | | 7/1996 | VanDenberg et al. |
| 5,597,174 A | | 1/1997 | Christenson et al. |
| 5,823,629 A | | 10/1998 | Smith et al. ............... 298/23 R |
| 5,897,123 A | | 4/1999 | Cherney et al. |
| 6,116,698 A | | 9/2000 | Smith et al. ............... 298/23 R |
| 6,123,347 A | | 9/2000 | Christenson |
| 6,158,750 A | * | 12/2000 | Gideon et al. |
| 6,189,901 B1 | * | 2/2001 | Smith et al. |
| 6,247,712 B1 | * | 6/2001 | Smith et al. |
| 6,311,993 B1 | * | 11/2001 | Hulstein et al. |
| 6,416,136 B1 | * | 7/2002 | Smith |

OTHER PUBLICATIONS

Oshkosh Truck Corp. brochure, dated Nov., 1998.
Silent Drive "MAXLE–IZE" flyer, undated.

* cited by examiner

Primary Examiner—Stephen T. Gordon
(74) Attorney, Agent, or Firm—Konneker & Smith, P.C.

(57) ABSTRACT

A tag axle suspension system for use with a dump vehicle and other systems provides weight reduction and enhanced safety and ride quality. In a described embodiment, a tag axle suspension system includes hanger brackets pivotably attached to a vehicle frame. Actuators push rearwardly on the hanger brackets to raise an axle relative to the vehicle frame. The hanger brackets are rigidly attached to a tubular member extending laterally across the vehicle frame. The tubular member is rotatably attached to the vehicle frame.

12 Claims, 4 Drawing Sheets

TAG AXLE SUSPENSION SYSTEM FOR A DUMP VEHICLE

BACKGROUND

The present invention relates generally to wheeled vehicle suspension systems and, in an embodiment described herein, more particularly provides a tag axle suspension system.

Tag axle suspension systems are used to increase the load carrying capabilities of a vehicle, such as a dump truck, flat bed truck or a cement truck. When the increased load carrying capability is not needed, the tag axle is raised, so that wheels at each end of the tag axle no longer contact a road surface.

Often, requirements for tag axles tend to make conventional lift axle suspension systems not generally suitable for use as tag axle suspension systems. For example, since tag axles may be positioned a relatively large distance from the nearest non-lift axle, the tag axles should be raised upward a greater distance to avoid contact with the road surface due to suspension jounce, to avoid contact with debris on the road, and to avoid contact with the road surface due to dips or humps in the road surface.

Some present tag axle suspension systems use actuators to raise and lower the tag axles. The actuators are pistons received in cylinders, typically referred to merely as "cylinders". Specifically, the cylinder of a tag axle suspension system is generally positioned above the tag axle and is extended to lower the tag axle.

Since the cylinder is extended when the tag axle is lowered, the fluid used to extend the cylinder is compressed when the tag axle is pushed upward, for example, due to irregularities in the road surface. To provide increased compressibility, nitrogen gas may be used in combination with hydraulic fluid, for example, by using a nitrogen filled rod. Generally, tag axle suspension systems use this compression of fluid in the cylinder to impart compliance to the suspension systems, i.e., to enable the suspension systems to traverse irregularities in the road surface. However, compression of fluid in cylinders usually causes early failure of seals on the pistons due to long periods of relatively high frequency displacement of the pistons in the cylinders. In addition, these types of systems are relatively expensive, due mainly to the requirement for special-purpose cylinders.

Typical tag axle suspension systems also do not include any provision for maintaining their caster angles during jounce and rebound of the suspension systems. As a result, steering accuracy and ride quality suffer.

These particular tag axle suspension systems are also very large and heavy for the increased load carrying capacity they provide. They are, therefore, somewhat inefficient for their intended purpose.

Furthermore, typical tag axle suspension systems handle braking and suspension loading in a way that is inconsistent with their purpose of increasing load carrying capacity. That is, they transfer braking and suspension loading to the vehicle frame improperly.

From the foregoing, it can be seen that it would be quite desirable to provide an improved tag axle suspension system.

SUMMARY

In carrying out the principles of the present invention, in accordance with an embodiment thereof, a tag axle suspension system is provided which solves the above problems in the art. The tag axle suspension system enhances safety and ride quality for a vehicle with which it is utilized.

In one aspect of the invention, a tag axle suspension system is provided which includes an axle, a suspension assembly, and an actuator attached to the suspension assembly. The suspension assembly is pivotable relative to a longitudinal frame of a vehicle to selectively raise and lower the axle. The actuator retracts to lower the axle, and the actuator extends to raise the axle.

In another aspect of the invention, a tag axle suspension system is provided which includes a hanger bracket pivotably attached to the vehicle frame. The axle is selectively raised and lowered by pivoting the hanger bracket. Two arms are pivotably attached between the axle and the hanger bracket. The arms may remain parallel to each other as they pivot relative to the hanger bracket and axle.

In yet another aspect of the invention, a tag axle suspension system is provided in which the vehicle frame includes spaced apart and longitudinally extending frame rails, each of the frame rails having a rear end. A tubular member is rotatably attached to the frame and extends laterally between the frame rail rear ends. Rotation of the member in one direction raises the axle, and rotation of the member in an opposite direction lowers the axle.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Representatively illustrated in FIGS. 1–4 is a tag axle suspension system 10 which embodies principles of the present invention. In the following description of the suspension system 10 and other apparatus and methods described herein, directional terms, such as "above", "below", "upper", "lower", etc., are used only for convenience in referring to the accompanying drawings. Additionally, it is to be understood that the embodiment of the present invention described herein may be utilized in various orientations, such as inclined, inverted, horizontal, vertical, etc., and in various configurations, without departing from the principles of the present invention.

Figure 1:
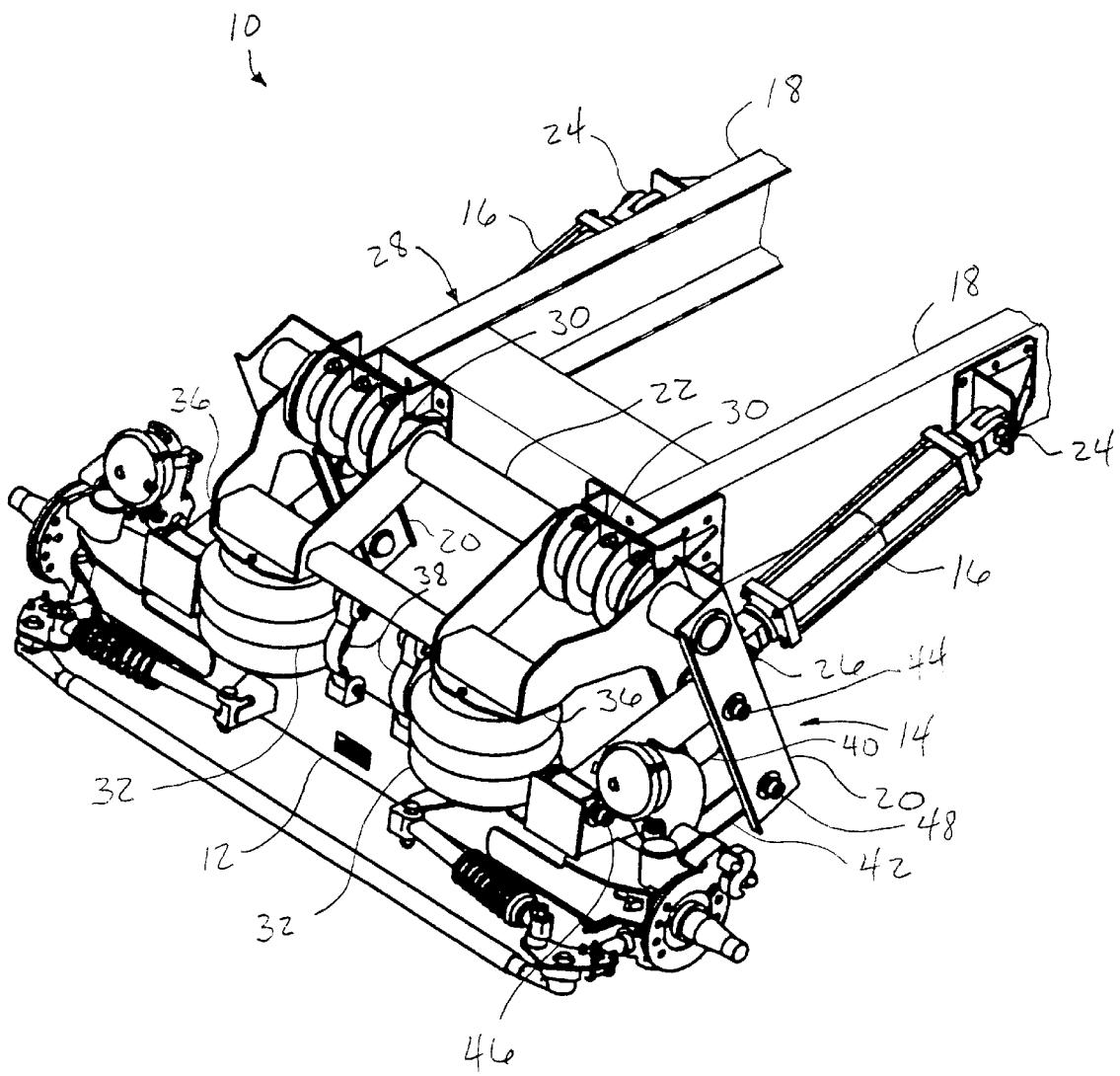
FIG. 1 is a perspective view of a tag axle suspension system embodying principles of the present invention.
Figure 2:
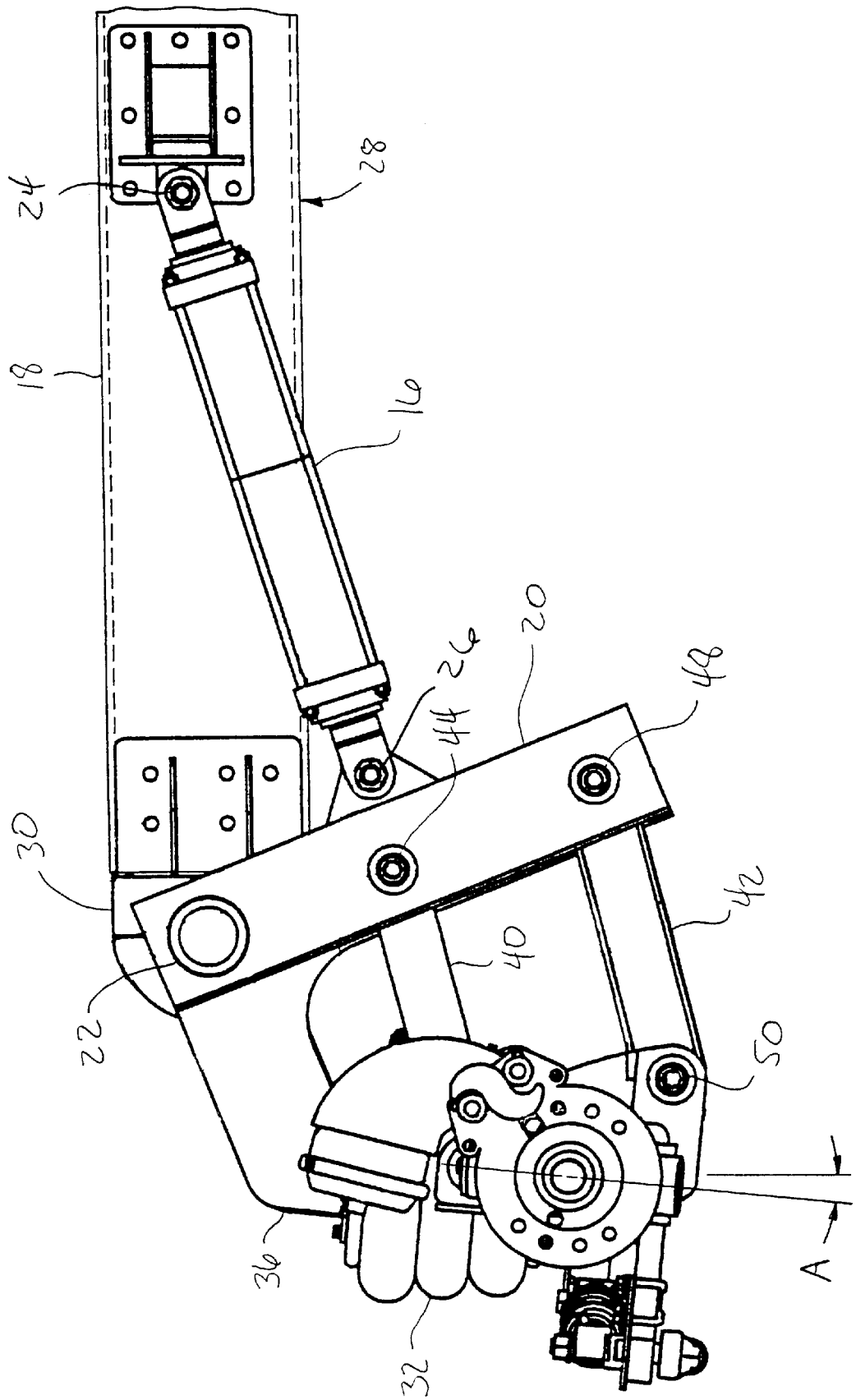
FIG. 2 is a side view of the tag axle suspension system.
Figure 3:
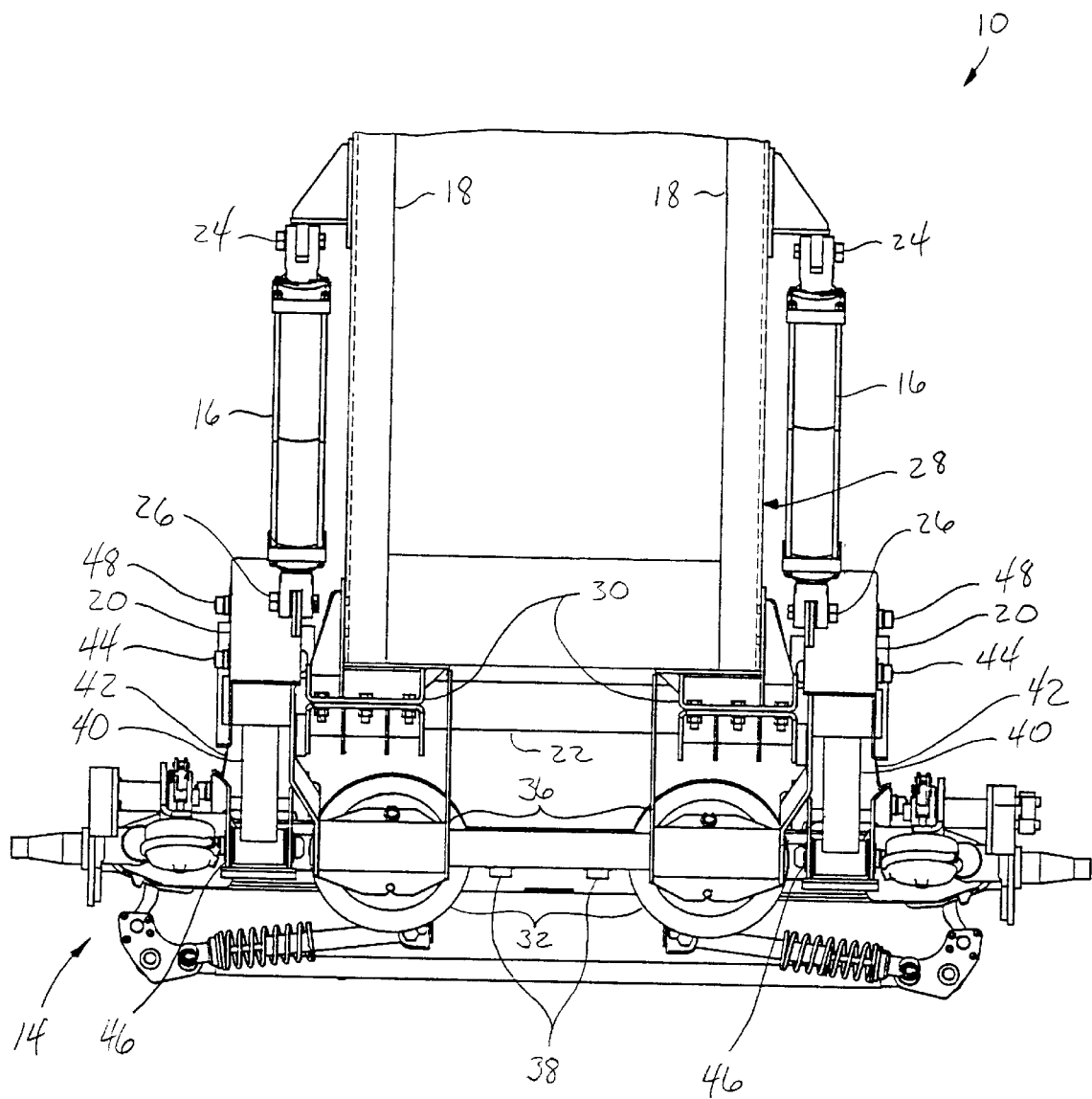
FIG. 3 is a top plan view of the tag axle suspension system.
Figure 4:
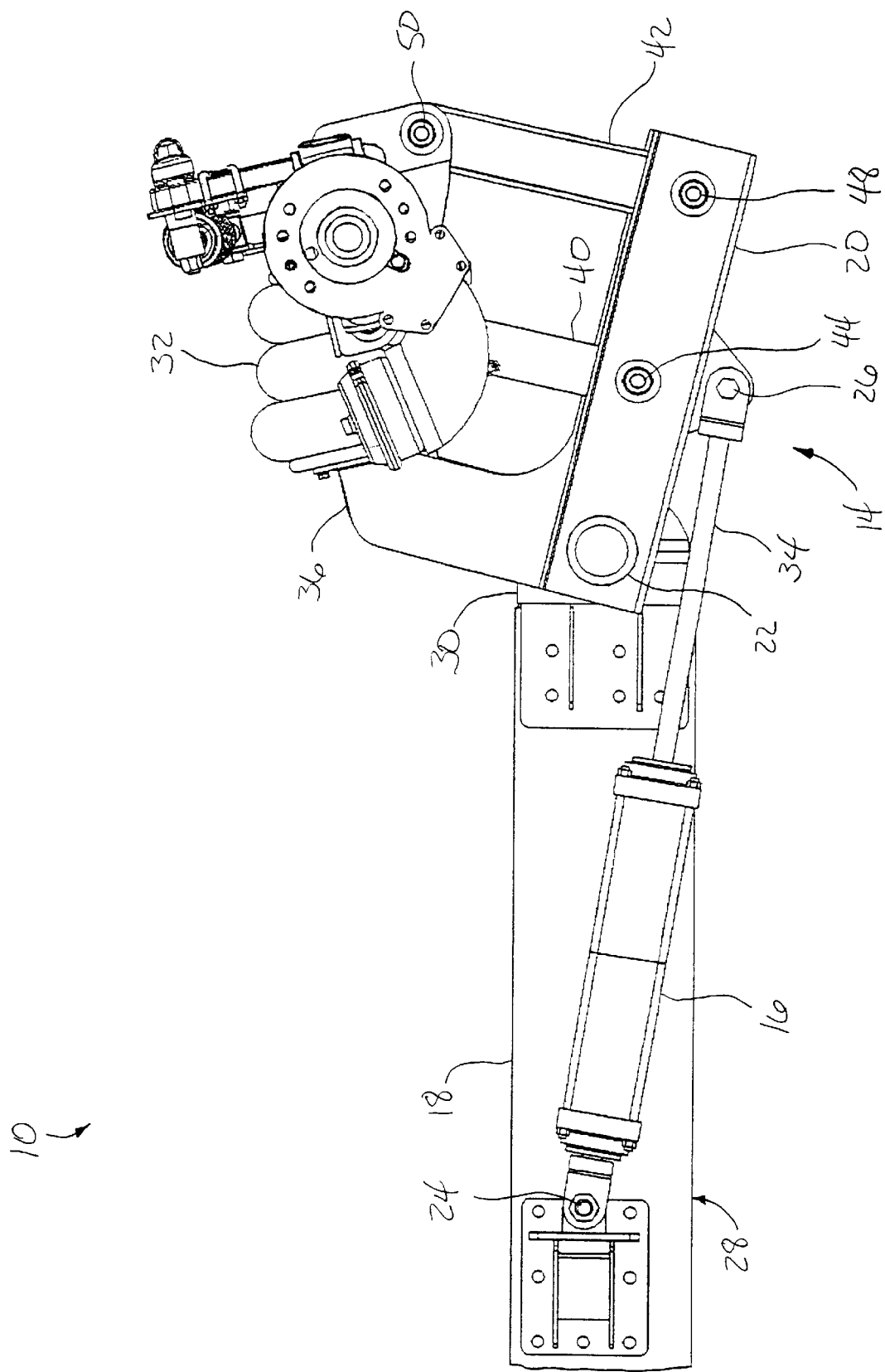
FIG. 4 is a side view of the tag axle suspension system, wherein an axle of the suspension system has been raised.

In FIGS. 1–3, the suspension system 10 is shown with an axle 12 in a lowered position, and in FIG. 4 the suspension system is shown with the axle raised. In the lowered position, tires on wheels (not shown) attached at opposite ends of the axle 12 are in contact with a road surface. In the raised position of the axle 12, the tires are not in contact with the road surface.

The suspension system 10 includes a suspension assembly 14 which is unique in the art of tag axle suspension systems. The suspension assembly 14 includes actuators 16 pivotably connected between longitudinal vehicle frame rails 18 and hanger brackets 20. The hanger brackets 20 are rigidly connected at opposite ends of a tubular member 22 which extends laterally across rear ends of the frame rails 18.

The actuators 16 are depicted as being of the piston and cylinder type, but it should be understood that other types of actuators could be used in keeping with the principles of the invention. For example, the actuators 16 could be electrically operated. Preferably, the actuators 16 are hydraulic cylinders, that is, they extend when hydraulic fluid is pumped therein, and they retract when hydraulic fluid is discharged therefrom.

The actuators 16 are connected to the frame rails 18 at pivots 24. The actuators 16 are connected to the hanger brackets 20 at pivots 26. When the actuators 16 are extended, they apply a rearwardly directed force to each of the hanger brackets 20, causing the suspension assembly 14 to pivot about the tubular member 22. For this purpose, the tubular member 22 is rotatably mounted to the rear end of the vehicle frame 28 with bushed connectors 30.

Note that the actuators 16 are retracted when the axle 12 is in its lowered position. Because of this unique arrangement, fluid in the actuators 16 is not compressed to provide suspension compliance. Instead, the air springs 32 provide suspension compliance, thereby enhancing ride quality. In addition, rods 34 attached to pistons (not shown) of the actuators 16 are not exposed to damage, for example, due to road debris, when the suspension system 10 is in its lowered load-carrying position.

However, it is to be understood that the actuators 16 could be extended when the axle 12 is in its lowered position, and retracted when the axle is in its raised position, without departing from the principles of the invention. In addition, any number of actuators, including one, could be used, and the actuator(s) could be otherwise positioned. For example, a single actuator could be mounted between the frame rails 18 and could be connected to a lever other than the hanger brackets 20. This lever (not shown) could extend upward from the tubular member 22, so that when the actuator is extended, the axle 12 is lowered to its load-carrying position.

The air springs 32 are positioned between the axle 12 and supports 36. The supports 36 extend rearwardly and downwardly from the tubular member 22 when the suspension assembly 14 is in its lowered position as depicted in FIGS. 1–3. The supports 36 are rigidly attached to the tubular member 22 so that, when the tubular member rotates relative to the frame 28, the supports pivot about the tubular member along with the hanger brackets 20.

Two devices 38 are attached between the air spring supports 36 and the axle 12 to limit extension of the air springs 32. The devices 38 are depicted as being straps, but it should be understood that the devices are not necessary and other devices could be used, for example, chains or shocks. Alternatively, the air springs 32 could be compressed when the axle 12 is lifted, for example, by using another pneumatic actuator to displace the axle 12 toward the air spring supports 36, in which case the devices 38 would not be used.

To prevent damage to the air springs 32, preferably a small amount of air pressure (e.g., 20 psi) is left in the air springs when the suspension assembly 14 is in its raised position as depicted in FIG. 4. Air pressure in the air springs 32 acts to extend the air springs and displace the axle 12 away from the supports 36. Since the suspension assembly 14 is not loaded when it is in its raised position, the air springs 32 could possibly over-extend if the devices 38 were not used.

Two arms, an upper arm 40 and a lower arm 42, are pivotably connected between each of the hanger brackets 20 and the axle 12. Each upper arm 40 is connected by a pivot 44 to its respective hanger bracket 20, and is connected by a pivot 46 to the axle 12. Each lower arm 42 is connected by a pivot 48 to its respective hanger bracket 20, and is connected by a pivot 50 to the axle 12.

Each set of pivots 44, 46, 48, 50 define vertices of a parallelogram. The arms 40, 42 are parallel to each other and remain so, even though the arms pivot and the axle 12 rises and falls as the suspension system 10 traverses irregularities in a road surface. The upper and lower pivots 48, 50 on the axle 12 also remain parallel with the upper and lower pivots 44, 48 on the respective hanger bracket 20, which maintains a caster angle A constant as the arms 40, 42 pivot and the axle rises and falls.

It is to be clearly understood, however, that any number of arms, including one, may be used, it is not necessary for the arms 40, 42 to be parallel to each other, and it is not necessary for the arms to remain parallel to each other as they pivot. If a single arm is used, it may be relatively rigidly attached to the axle 12, instead of being pivotably attached to the axle. Note that, when using the arms 40, 42, the caster angle A may be permitted to change a small amount, for example ~4–6°, when the arms are not quite parallel to each other.

It will be readily appreciated by those skilled in the art that the suspension system 10 represents a significant advance in the tag axle suspension system art. Because of its unique configuration, suspension and brake loading are transmitted by the suspension system 10 to the frame 28 by forces pushing forward on the connectors 30 by the tubular member 22. This reduces stress in the fasteners used in the connectors 30 and contributes to the overall safety of the suspension system 10.

Because the actuators 16 are in their retracted positions when suspension loading is experienced, fluid therein is not compressed and the hanger brackets 20 are maintained in their positions, which prevents the caster angle A from changing. This enhances ride quality and steering accuracy.

Because the actuators 16 are in their extended positions only when the suspension system 10 is in its raised position, only relatively low pressure is needed in the actuators while they are extended. This reduces the possibility of the actuators 16 buckling while high pressure and suspension and brake loading are applied thereto.

Because the air springs 32 are used to absorb axle 12 deflection while traversing road surface irregularities, the actuators 16 are not needed and are not used for this purpose. Air springs 32 provide enhanced ride quality as compared to the use of cylinders for this purpose.

The use of the tubular member 22 reduces weight and allows the hanger brackets 20 to be widely spaced apart. The tubular member 22 functions both as a part of the pivot for rotating the tag axle suspension system 14 and as a structural cross-member for mounting the hanger brackets 20 and air spring supports 36.

Another improvement is found in the air spring supports 36, which can be designed to buckle if excessive suspension loading is encountered, such as, if the suspension system 10 bottoms out. This prevents any debris from being dropped on the road due to a suspension system failure, while still allowing the axle 12 to deflect upward to traverse road surface irregularities.

Of course, a person skilled in the art would, upon a careful consideration of the above description of representative embodiment of the invention, readily appreciate that many modifications, additions, substitutions, deletions, and other changes may be made to this specific embodiment, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A tag axle suspension system for a wheeled vehicle, comprising:

an axle;

a suspension assembly pivotable relative to a longitudinal frame of the vehicle to selectively raise and lower the axle, the suspension assembly including a hanger bracket pivotably attached to the vehicle frame, and first and second arms, each of the first and second arms being pivotably connected to the hanger bracket, each of the first and second arms being pivotably connected to the axle, and wherein pivots at opposite ends of the first and second arms define a parallelogram; and an actuator attached to the suspension assembly, the actuator retracting to lower the axle, and the actuator extending to raise the axle.

2. The tag axle suspension system according to claim 1, wherein the actuator is a piston received within a cylinder, one of the piston and cylinder being pivotably attached to the vehicle frame, and the other of the piston and cylinder being pivotably attached to the suspension assembly.

3. The tag axle suspension system according to claim 1, wherein the actuator is a hydraulic actuator.

4. The tag axle suspension system according to claim 1, wherein the actuator is connected between the vehicle frame and the hanger bracket.

5. The tag axle suspension system according to claim 3, wherein the suspension assembly includes an air spring attached to the axle.

6. The tag axle suspension system according to claim 1, wherein the first and second arms remain parallel to each other as the arms pivot relative to the hanger bracket and axle.

7. The tag axle suspension system according to claim 1, further comprising a generally tubular member extending laterally relative to the vehicle frame, the tubular member being rotatably attached to the vehicle frame, and the suspension assembly being attached to the tubular member, so that as the tubular member rotates relative to the vehicle frame, the suspension assembly pivots about the tubular member.

8. The tag axle suspension system according to claim 1, wherein the actuator exerts a rearwardly directed force on the suspension assembly to raise the axle.

9. The tag axle suspension system according to claim 7, wherein the hanger bracket is rigidly attached to the tubular member.

10. The tag axle suspension system according to claim 7, wherein the suspension system includes an air spring support rigidly attached to the tubular member, and an air spring attached to the air spring support.

11. The tag axle suspension system according to claim 10, wherein expansion of the air spring displaces the axle away from the air spring support.

12. The tag axle suspension system according to claim 11, wherein the suspension assembly further includes a device attached to the air spring support and to the axle, the device limiting displacement of the axle away from the air spring support.

* * * * *